E. JOURNELL.
CYCLE FRAME.
APPLICATION FILED JUNE 28, 1915.
1,167,699.
Patented Jan. 11, 1916.
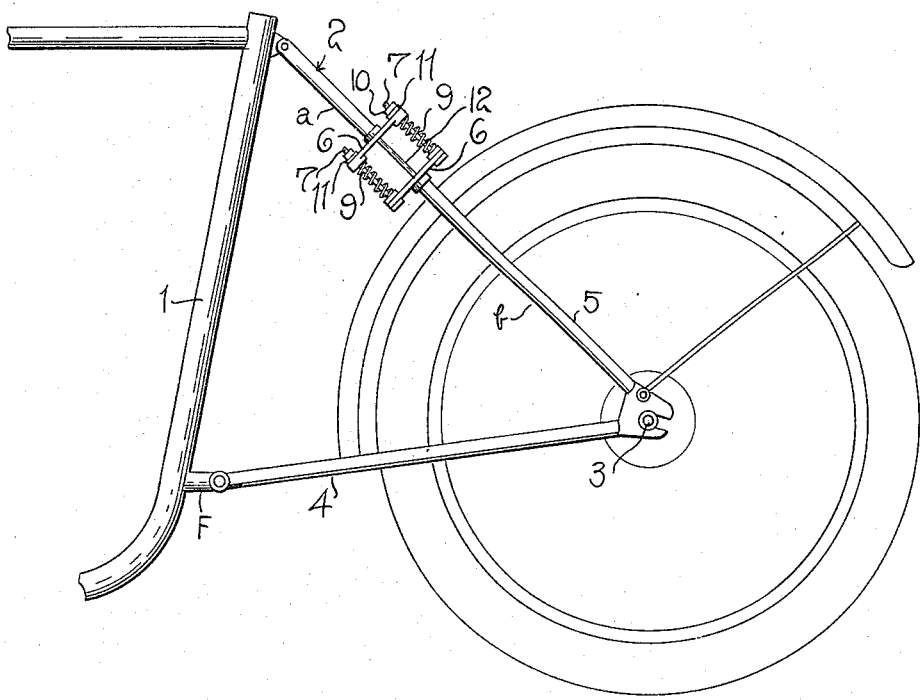
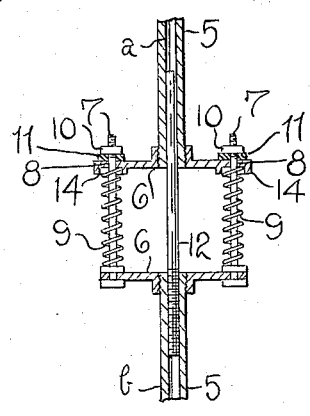
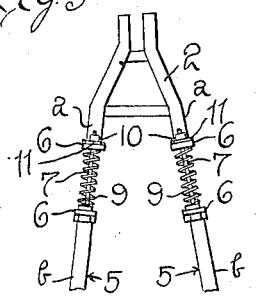
Inventor
E. JOURNELL
By Watson E. Coleman
Attorney

UNITED STATES PATENT OFFICE.

ELMER JOURNELL, OF URBANA, OHIO.

CYCLE-FRAME.

1,167,699.  Specification of Letters Patent.  Patented Jan. 11, 1916.

Application filed June 28, 1915. Serial No. 36,846.

*To all whom it may concern:*

Be it known that I, ELMER JOURNELL, a citizen of the United States, residing at Urbana, in the county of Champaign and State of Ohio, have invented certain new and useful Improvements in Cycle-Frames, of which the following is a specification, reference being had to the accompanying drawings.

This invention relates to certain improvements in cycle frames, and it is an object of the invention to provide a device of this general character having novel and improved means whereby the rear fork is capable of a predetermined degree of resiliency so as to effectively absorb the undue vibrations or shocks incident to travel.

The invention consists in the details of construction and in the combination and arrangement of the several parts of my improved cycle frame whereby certain important advantages are attained and the device is rendered simpler, less expensive and otherwise more convenient and advantageous for use, all as will be hereinafter more fully set forth.

The novel features of the invention will be carefully defined in the appended claims.

In order that my invention may be the better understood, I will now proceed to describe the same with reference to the accompanying drawings, wherein—

Figure 1 is a fragmentary view in side elevation of a cycle frame, showing an embodiment of my invention employed in connection therewith; Fig. 2 is an enlarged detail sectional view illustrating the resilient connection between the sections of a stem of a rear fork arranged in accordance with my invention as disclosed in Fig. 1; and Fig. 3 is a fragmentary elevational view of the rear fork as herein disclosed.

As disclosed in the accompanying drawings, 1 denotes the seat post of a conventional frame and preferably of the type used in connection with motor cycles, and pivotally engaged with the upper portion of the seat post 1 is the fork 2 with which the rear wheel of the cycle is adapted to coact in a conventional manner, said fork being engageable with the axle 3 of said wheel. Also in engagement with the axle 3 are the side bars 4 in pivotal engagement with the frame F adjacent the lower extremity of the seat post 1.

Each of the stems 5 of the fork consists of two sections $a$ and $b$ having secured to adjacent extremities the cross arms 6 and the extremities of the cross arms secured to the lower sections $b$ have extending upwardly therefrom the rods 7 disposed through suitable openings 8 produced in the cross arms 6 of the upper section $a$. Interposed between the cross arms and surrounding the rods 7 are the expansible coil springs 9 serving to normally maintain said sections $a$ and $b$ separated, the extent of separation being controlled by the stops 10 secured to the upper extremities of the rods 7 and engageable with the upper surface of the cross arm 6 of the upper section $a$. I find it of advantage to provide said cross arm with the buffers 11 with which the stops coact, for a purpose which is believed to be self-evident. I also find it particularly advantageous to secure to the upper end of the lower section $b$, the guide rod 12 which extends within the upper section $a$, it being understood that the sections $a$ and $b$ are tubular. The rod 12 serves to maintain the sections $a$ and $b$ in requisite alinement. I also find it of advantage to have the extremities of the cross arms 6 provided with annular depressions 14 to receive the extremities of the springs 9 in order to facilitate the operation of the device. It is thought to be self-evident that the relative movements of the sections $a$ and $b$ under tension of the springs 9 will serve to effectively absorb all undue vibration or shock incident to the travel of the cycle equipped with a rear fork constructed in accordance with an embodiment of my invention as herein set forth.

From the foregoing description, it is thought to be obvious that a cycle frame constructed in accordance with my invention is of an extremely simple and comparatively inexpensive nature and is particularly well adapted for use by reason of the convenience and facility with which it may be assembled, and it will also be obvious that my invention is susceptible of some change and modification without material departure from the principles and spirit thereof and for this reason I do not wish to be understood as limiting myself to the precise arrangement and formation of the several parts herein shown in carrying out my invention in practice.

I claim:

1. As a new article of manufacture, a wheel fork, the stems thereof being in sections, cross arms carried by the adjacent ends of the sections, expansible members interposed between the extremities of the cross arms, a rod carried by each extremity of one of the cross arms and loosely disposed through the adjacent extremity of the second cross arm, means carried by the free extremity of the rods for limiting the separating movement of the sections, and buffers coacting with said last named means.

2. As a new article of manufacture, a wheel fork, the stems thereof being in sections, cross arms carried by the adjacent ends of the sections, expansible members interposed between the extremities of the cross arms, a rod carried by each extremity of one of the cross arms and loosely disposed through the adjacent extremity of the second cross arm, means carried by the free extremity of the rods for limiting the separating movement of the sections, and a guide member carried by a section of each of the standards and telescopically engaging the coacting section.

In testimony whereof I hereunto affix my signature in the presence of two witnesses.

ELMER JOURNELL.

Witnesses:
S. J. BARGER,
C. E. BARGER.

Copies of this patent may be obtained for five cents each, by addressing the "Commissioner of Patents. Washington. D. C."